Sept. 28, 1965
G. E. BOLLIBON ETAL
3,209,183
DYNAMOELECTRIC MACHINE
Original Filed July 10, 1958
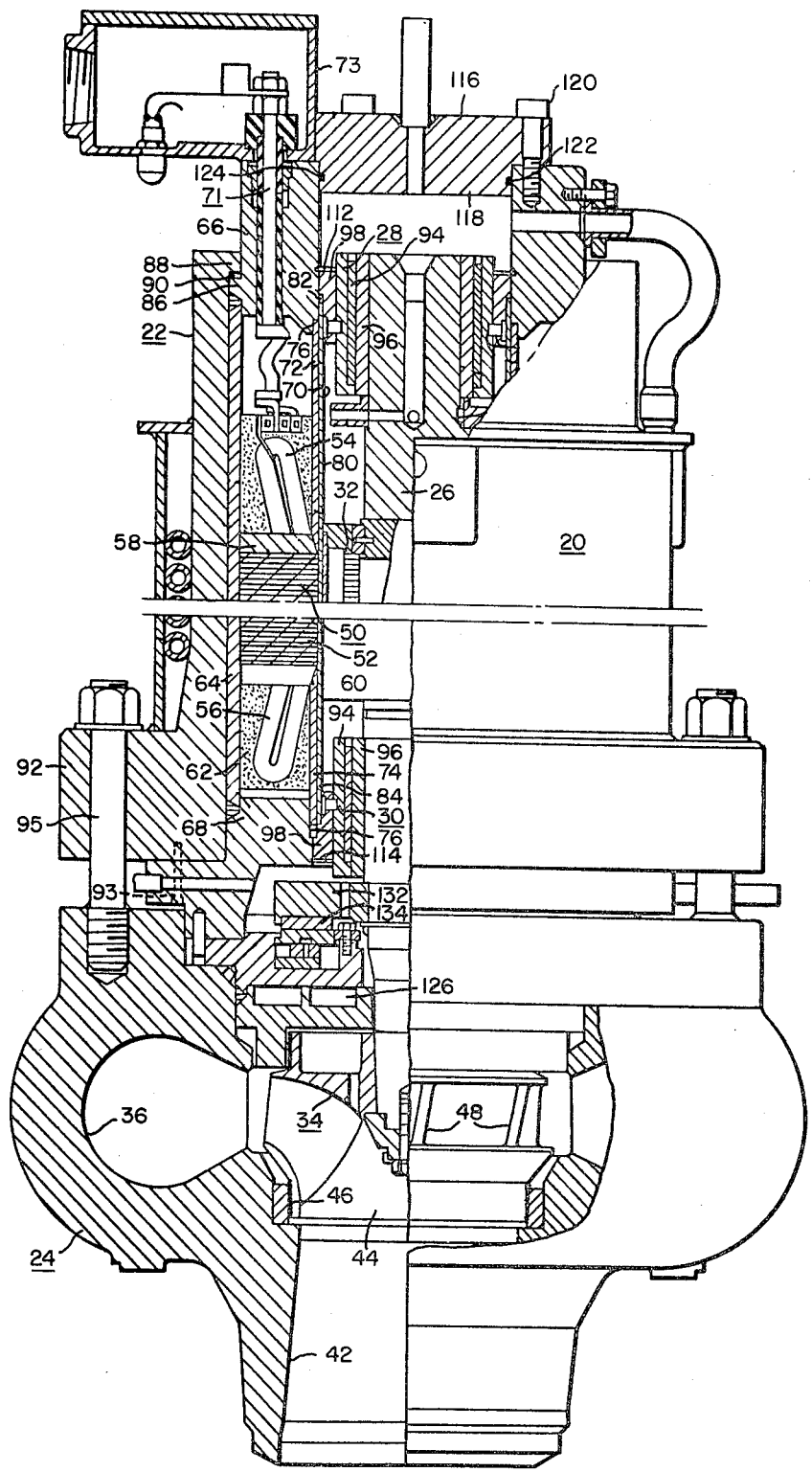

United States Patent Office 3,209,183
Patented Sept. 28, 1965

3,209,183
DYNAMOELECTRIC MACHINE
George E. Bollibon, Pittsburgh, and Edward A. Macha, Wilmerding, Pa., assignors to Westinghouse Electric Corporation, East Pittsburgh, Pa., a corporation of Pennsylvania
Original application July 10, 1958, Ser. No. 747,771, now Patent No. 3,013,500, dated Dec. 19, 1961. Divided and this application Mar. 1, 1961, Ser. No. 92,539
5 Claims. (Cl. 310—87)

The present invention relates to dynamoelectric machinery and more particularly to a new and improved construction of a motor-pump unit adapted for pumping fluids at elevated temperatures in which the bearings of the pump are lubricated by the fluid being pumped. This application is a division of copending application Serial No. 747,771, filed July 10, 1958 and entitled Sealed Dynamoelectric Machine, now Patent 3,013,500, issued December 19, 1961.

Motor-pump units of the character described frequently are employed in sealed applications. Such units employ a sealed stator cartridge and a sealed rotor bore with the rotor bore being separated from the stator cartridge by an enclosure or "can." It is desirable to provide for access to the rotor without dismantling the stator cartridge, and likewise, to obtain access to the stator without disturbing the rotor.

It is also desirable to provide means for relatively easy removal of the stator assembly from the motor-pump unit for purposes of repair or replacement. Such removal is facilitated by the invention, particularly where the stator assembly is hermetically sealed, by furnishing the stator assembly and component structural parts in the form of a removable cartridge. The stator cartridge is arranged for ready removal from the motor housing after first disengaging the latter. Similarly access to the rotor bore is facilitated by the invention through the use of access openings and removable bearing mountings.

It is therefore an object of the invention to provide a novel and efficient motor-pump unit adapted particularly for pumping fluids at elevated temperatures.

Another object of the invention is the provision of the motor-pump unit having improved means for mounting the rotor bearings to afford access to the rotor without disturbing the stator.

Still another object of the invention is to provide a motor-pump unit having improved means for facilitating removal of and for cooling the stator assembly.

Another object of the invention is the provision of a dynamoelectric machine having an improved cartridge type stator, whereby the stator is adapted for easy removal.

During the course of the following detailed description of an exemplary form of the invention, the foregoing and additional objects, features and advantages of the invention will be elaborated upon. The following description is to be read in conjunction with the accompanying drawings, in which:

The figure is an elevational view partially in section of one form of the invention as arranged for application with a motor-pump unit.

With reference now more particularly to the drawings, the illustrative form of the invention shown therein is associated with a motor-pump unit 20 including a motor housing 22 and a pump casing 24. A driving shaft 26 is mounted for rotation within the motor housing 22 on a pair of radial bearing arrangements 28 and 30 presently to be described. A rotor 32 is secured to the driving shaft 26 for rotation therewith at a position intermediate the bearings 28 and 30. The lower end of the driving shaft as viewed in the figure of the drawings extends downwardly into the pump casing 24, to which end a pump impeller 34 is secured for rotation within the pump casing 24.

The interior of the pump casing 24 is formed into a spiral discharge passage 36, termed a volute, and an intake or suction port 42 which communicates with eye 44 of the impeller 34. A labyrinth seal of conventional design, which is denoted generally by the reference character 46, is mounted in the pump casing 24 at a position adjacent the eye 44 of the impeller to prevent high pressure fluid in the volute 36 from flowing back to the intake port 42. The impeller 34 is provided with a plurality of vanes or blades 48 in a conventional manner, which propel fluid from the intake port 42 into the volute 36.

The rotor 32 is positioned within a generally tubular stator cartridge 50. The stator cartridge 50 includes a hollow stator core 52 provided with windings in the well known manner, the end turns of which are designated by the reference characters 54 and 56. The end turns 54 and 56 in this example extend through slotted end rings 58 and 60 and are embedded in a conventional potting compound 62. The stator 52 is encased within an outer shell 64 which is joined at its ends as by welding to a pair of annular end rings or tubular extensions 66 and 68.

At each end of the stator core 52 adjacent the bore 70 thereof, a back-up and spacing sleeve 72 or 74 is mounted in alignment with the bore 70 and engages the tubular extensions 66 and 68 respectively. The outward ends of the sleeves 72 and 74 are desirably seated respectively in offset portions 76 formed at the inner periphery of the end members 66 and 68.

The stator 52 is hermetically sealed within the cartridge 50 by means of a stator "can" or enclosure 80. The stator can 80 desirably is fabricated from a corrosion-resistant material, such as stainless steel, in order to ensure its integrity. The enclosure is hermetically sealed at its ends to the end members 66 and 68 respectively by means of annular sealing welds at 82 and 84.

Terminal means such as terminal 71 for the stator 52 extends longitudinally through suitable apertures in the upper end member 66 for connection to the stator windings. The outward end of the terminal 71 is housed within a removable connection box 73.

The cartridge shell 64 fits relatively closely within the motor housing 22 and the upper end member 66 of the stator cartridge 50 is retainable by engagement between its annular shoulder 86 and an integral lip 88 formed at the upper end of the motor housing 22. In practice however, a gap 90 is left between the end member shoulder 86 and the housing lip 88 to compensate for manufacturing clearances and for differential longitudinal expansion between the cartridge shell 64 and the adjacent housing 22. The stator cartridge 50 therefore actually is positioned within the motor housing 22 by engagement of the lower end member 68, provided with a stepped configuration for this purpose, with mounting flange 92 at the lower end of the housing 22 and by additional means presently to be described. When operating the pump with a pressurized fluid, the fluid within the rotor cavity 70, of course, exerts a pressure radially to the stator cartridge 50 and therefore no longitudinal force is imparted to the upper end member 66.

To aid in assembling the motor-pump unit 20, the lower end member 68 of the stator cartridge is secured initially to the lower end 92 of the housing 22 by means of a plurality of bolts 93. Engagement between the lower end member 68 and the housing flange 92 is maintained after assembly of the motor-pump unit 20 by a plurality of main flange or mounting studs 95 and associated components presently to be described. However, in the event of rupture in the stator can 80, the system pressure, of course, would be applied to the interior of the stator cartridge in which case the upper end member 66 would be forced against the retaining lip 88 of the housing 22.

The radial bearings 28 and 30, which are employed as aforesaid for mounting the driving shaft, are supported respectively by the stator end members 66 and 68. The bearing assemblies 28 and 30 each comprise a bearing cartridge 94 of known design which is arranged for bearing engagement with a shaft sleeve or journal member 96.

Each bearing 28 and 30 is provided with a mounting member 98 and the mounting members 98 are retained within the cartridge end members 66 and 68 respectively by engagement between the ends of the stator enclosure 80 and by a pair of retaining rings 112 and 114, as shown in the figure. The retaining rings 112 and 114 are seated into circumferential grooves provided in the end members 66 and 68 adjacent the outward ends of the bearing mounting members 98.

When disassembling the motor-pump unit 20 to remove the bearings 28 and 30, it is only necessary to disengage the retaining rings 112 and 114. The lower retaining ring 114, of course, is accessible by disengaging the mounting studs 95 and raising the motor housing 22 and stator cartridge 50 secured thereto a short distance and inserting a suitable tool to remove the retaining ring 114. Following this operation, the stator 52 and the housing 22 can be lifted from the rotor 32 and associated components.

The upper bearing assembly 28 is accessible without disassembling the motor-pump unit by removing stator cartridge cap 116. The cap 116 is provided with a reduced portion 118 whereby the cap 116 is inserted into the open end of the upper stator cartridge end member 66 and secured in this position by means of a plurality of mounting bolts 120. The junction between the stator cartridge 50 and its cap 116 is sealed by means of a sealing ring 122 inserted into an annular groove 124 formed in one of the confronting surfaces of the cap 116 and the stator cartridge 50. In this arrangement the groove 124 and ring 122 are applied to the reduced portion 118 of the stator cartridge cap. With this arrangement the rotor cavity 70 is sealed within the stator cartridge 50.

The rotor cavity 70 is prevented from communicating with the interior of the pump casing or volute 36 by means of the lower radial bearing 30, a thermal barrier 126, and labyrinth seals 128 and 130.

A thrust runner 132 is secured to the driving shaft 26 for rotation therewith and is provided with an annular bearing member 134. The bearing member 134 is arranged for engagement with a Kingsbury type thrust bearing denoted generally by the reference numeral 136 or with a thrust bearing and thermal barrier arrangement of the type described and claimed in a copending application of G. E. Bollibon et al., entitled Motor-Pump Unit, filed September 3, 1958, Serial No. 758,809, and now Patent 2,972,309, assigned to the assignee of the present application.

Although the cartridge shell 64 is furnished initially with suitable clearances to enable facile insertion of the stator cartridge 50 into the motor housing 52, the cartridge shell 64 will expand at the normal operating temperatures of the operating pump unit into contiguous engagement with the inner periphery of the motor housing 22 with the result that the rate of heat transfer between the cartridge shell 64 and the housing 22 is increased greatly. This expansion of the cartridge 64 relative to the motor housing 22 occurs on at least two accounts: Firstly, the cartridge shell 64 being adjacent the stator 52 is at slightly higher temperature. In the second place, the motor housing 22 is considerably thicker in the radial direction than is the cartridge shell 64 and therefore the radial expansion of the housing is less. In addition, the enclosure 80 being closer to the rotor bore 70 and adjacent stator 50 and being thinner than both shell 64 and housing 22 will also be subjected to different thermal conditions, resulting both in different thermal expansion coefficients and faster thermal expansion rates than housing 22.

For additional information concerning the description and operation of other features of the canned motor pump which do not pertain specifically to the inventive features in this divisional application, reference may be had to the parent application, now Patent 3,013,500, issued December 19, 1961 which is incorporated by reference herein.

From the foregoing description it will be apparent that a novel and efficient motor-pump unit has been disclosed herein. It will be understood that the accompanying descriptive materials are presented for purposes of exemplifying the invention and should not be interpreted as limitative thereof.

Numerous embodiments therefore will occur to those skilled in the art without departing from the spirit and scope of the invention. Moreover, it is to be understood that certain features of the invention can be employed without a corresponding use of other features.

We claim as our invention:

1. A dynamoelectric machine comprising a tubular housing; a tubular stator cartridge inserted within said housing and conforming thereto, said cartridge including a shell, a stator core, a pair of sleeves spaced from said shell and engaging respectively the ends of said core, a pair of end rings engaging respectively the ends of said shell and the adjacent ends of said sleeves for enclosing said cartridge; a driving shaft mounted within said stator cartridge; anti-frictional means mounted on said stator cartridge and supporting said shaft for rotation; a rotor secured to said driving shaft for rotation therewith, said rotor being disposed within said stator core; an outwardly extending flange formed on one of said end rings and overlying the adjacent end of said housing; means for mounting said flange in engagement with said adjacent housing end; and a pair of cooperating stops secured respectively to the opposite end of said housing and the other of said end rings, said stops being disposed in juxtaposed relation to retain said stator cartridge within said housing but being spaced to permit longitudinal expansion of said cartridge relative to said housing prior to engagement of said stops; and means for closing the open ends of said stator cartridge.

2. A dynamoelectric machine comprising a relatively thick tubular outer housing capable of retaining a pressurized high temperature fluid therein; a stator cartridge inserted within said housing, said stator cartridge including an outer shell conforming substantially to said housing, a hollow stator assembly inserted within said shell, a pair of sleeve members spaced from said shell and engaging the ends of said stator assembly at the inner periphery thereof, and means for enclosing the space between the ends of said shell and the outward ends respectively of said sleeves; a driving shaft mounted within said stator cartridge; anti-frictional means mounted on said enclosing means and supporting said shaft for rotation; a rotor secured to said driving shaft for rotation therewith, said rotor being disposed within said stator core; means for closing and sealing the open ends of said stator assembly; heat transfer means for removing heat from the outer surface of said housing; and said outer shell being relatively thinner than said housing, whereby the heat and pressure of the interior of said dynamoelectric machine causes said shell to expand into contiguous contact with said housing.

3. A stator cartridge for a dynamoelectric machine, said cartridge including a stator assembly of annular configuration, a pair of relatively thick end rings spaced from the ends of said stator assembly, respectively, supporting means disposed adjacent the inner periphery of said assembly and said end rings and fixedly secured to the latter, an outer casing for said cartridge of annular configuration, said outer casing being mounted on said cartridge and receiving said stator assembly and at least a portion of each of said end rings therein, one of said end rings including an outwardly extending flange member disposed in the outer periphery thereof and extending toward said casing, said casing having a circumferential projection disposed adjacent one end thereof and extending inwardly from the inner periphery thereof to overlie said flange, said projection being axially spaced from said flange to form an axial clearance therebetween and being disposed between said flange and the outwardly facing end surface of said one end ring, whereby said flange must be moved axially to engage said projection and means coupled to the other end of said casing for fixedly securing said casing in the aforesaid position.

4. In a dynamoelectric machine, a stator cartridge of annular configuration, a rotor disposed within said cartridge and mounted for rotation therewithin, said cartridge including a stator assembly of annular configuration, a pair of relatively thick end rings spaced from the ends of said stator assembly, respectively, supporting means disposed adjacent the inner periphery of said assembly and said end rings and fixedly secured to the latter, an outer casing for said cartridge of annular configuration, said outer casing being mounted on said cartridge and receiving said stator assembly and at least a portion of each of said end rings therein, one of said end rings including an outwardly extending flange member disposed on the outer periphery thereof and extending toward said casing, said casing having a circumferential projection disposed adjacent one end thereof and extending inwardly from the inner periphery thereof to overlie said flange, said projection being axially spaced from said flange to form an axial clearance therebetween and being disposed between said flange and the outwardly facing end surface of said one end ring, whereby said flange must be moved axially to engage said projection, and means coupled to the other end of said casing for fixedly securing said casing in the aforesaid position.

5. A dynamoelectric machine comprising, a tubular stator cartridge, a relatively thick tubular outer housing receiving said stator cartridge thereon, a pair of tubular extensions positioned in alignment with and spaced from the ends of said stator cartridge, the openings in said tubular stator cartridge and in said tubular extensions being aligned to form a rotor bore, relatively thin tubular enclosure means extending along said rotor bore and secured respectively at its ends to said tubular extensions to isolate said rotor bore from said stator cartridge, means for closing the ends of said rotor bore, said outer housing having one end thereof fixedly positioned relative to one of said extensions, said other housing end and said other extension having axially spaced cooperative stop means thereon positioned to form an axial clearance therebetween to permit limited axial movement of said other extension relative to said housing.

References Cited by the Examiner

UNITED STATES PATENTS

| | | | |
|---|---|---|---|
| 2,654,848 | 10/53 | Schaefer | 310—87 X |
| 2,687,695 | 8/54 | Blom | 310—86 X |
| 2,739,252 | 3/56 | Patterson et al. | 310—87 |
| 2,761,985 | 9/56 | Schaefer | 310—87 |
| 2,777,963 | 1/57 | Kuntz | 310—86 X |
| 2,883,566 | 4/59 | Briggs | 310—87 |
| 2,887,061 | 5/59 | Cametti et al. | 310—87 X |
| 2,887,062 | 5/59 | Cametti | 310—54 |
| 2,913,988 | 11/59 | White | 310—54 |
| 2,944,297 | 7/60 | Maynard | 310—87 X |
| 2,964,659 | 12/60 | Steele | 310—54 |
| 3,067,690 | 12/62 | Kramer | 310—86 |

MILTON O. HIRSHFIELD, *Primary Examiner.*